(12) United States Patent
Scalise et al.

(10) Patent No.: US 6,393,505 B1
(45) Date of Patent: May 21, 2002

(54) METHODS AND APPARATUS FOR DATA BUS ARBITRATION

(75) Inventors: Albert M. Scalise, San Jose; Jano D. Banks, Cupertino, both of CA (US)

(73) Assignee: DVDO, Inc., Sunnyvale, CA (US)

( * ) Notice: Subject to any disclaimer, the term of this patent is extended or adjusted under 35 U.S.C. 154(b) by 0 days.

(21) Appl. No.: 09/227,502

(22) Filed: Jan. 6, 1999

(51) Int. Cl.[7] .............................................. G06F 13/00
(52) U.S. Cl. ......................... 710/107; 710/40; 710/113; 710/240; 710/241; 710/244
(58) Field of Search .............................. 710/113, 36, 40, 710/107, 111, 240, 241, 244

(56) References Cited

U.S. PATENT DOCUMENTS

| | | | |
|---|---|---|---|
| 5,557,608 A | * 9/1996 | Calvignac et al. | 370/389 |
| 5,905,998 A | * 5/1999 | Ebrahim et al. | 711/144 |
| 5,956,341 A | * 9/1999 | Galand et al. | 370/412 |
| 6,041,039 A | * 3/2000 | Kilkki et al. | 370/230 |

OTHER PUBLICATIONS

Micron Technology Inc., *Technical Note, Achieve Maximum Compatibility In SDRAM/SGRAM Design*, Compatibility in SDRAM/SGRAM Design, May, 1997.

Micron Technology Inc., *Synchronous DRAM*, 16 MEG: x16 SDRAM, Oct., 1997.

\* cited by examiner

*Primary Examiner*—Ario Etienne
(74) *Attorney, Agent, or Firm*—Oppenheimer Wolff & Donnelly, LLP

(57) ABSTRACT

A data bus arbitration system is disclosed including a bus status monitor which is coupled to a data bus and generates a bus status signal for use by an arbiter. The arbiter is coupled to a number of requesters, each of which belongs to a distinct class of requesters. The arbiter arbitrates between multiple requests using heuristics dependent upon the classes of the requesters. The nature of one class of requestors is that the requestors have real time requirements which must be met in order to maintain data integrity within the system. The nature of a second class of requestors is such that the requestors have semi-real time requirements which must be met in order to maintain data integrity within the system. The nature of the system is such that the available bandwidth must be utilized very efficiently in order to maintain data integrity within the system. The arbiter system disclosed grants access to the requesters using the heuristics disclosed while maintaining an efficiency of at least 80% of the total bandwidth for all requestors.

20 Claims, 10 Drawing Sheets

METHODS AND APPARATUS FOR DATA BUS ARBITRATION

CROSS REFERENCE TO RELATED APPLICATIONS

This application is related to co-pending U.S. patent application Ser. No. 09/226,776 entitled Methods And Apparatus For Variable Length SDRAM Transfers filed on the same day, which is incorporated herein by reference.

BACKGROUND OF THE INVENTION

1. Field of the Invention

The present invention relates generally to arbitration for access to a digital device and more particularly, to techniques for arbitrating multiple data transfer requests to optimize the operation of a computer system.

2. Description of the Related Art

Dynamic random access memory (DRAM) is used to provide a number of different functions in computers including: "scratch pad" memory and video frame buffers. Synchronous dynamic random access memory (SDRAM) is a type of DRAM designed to deliver bursts of data at very high speed using automatic addressing, multiple page interleaving, and a synchronous (or clocked) interface. The SDRAM is typically monitored and managed by a SDRAM controller.

The SDRAM controller receives data transfer requests for memory access to the SDRAM. To establish the priority of the data transfer requestors, the SDRAM controller generally includes an arbiter. The arbiter receives information from the requestors to determine the type of data transfer requested, and then uses an arbitration scheme to assign a priority to each of the requesters. The SDRAM controller then grants memory access to the SDRAM based on the priority established by the arbiter.

Perhaps the simplest type of arbitration scheme is fixed priority, where each type of request in a system is assigned a fixed priority. When an arbiter receives multiple requests, the request with the highest priority always receives access to the data bus. For example, if there is a request A of high priority and request B of medium priority, then request B will receive memory access only if request A is not present.

A major problem with fixed priority arbitration schemes is that they can handle only a limited number of requesters because of the risk that devices with a low priority will not be timely serviced, if at all. For example, in a fixed priority scheme, if there is a request A of high priority, request B of medium priority, and request C of low priority, and the arbiter is constantly bombarded with requests A and B, then request C will "starve" and never be serviced. The risk of starvation rises with the number of devices that request service. In fact, if a fixed priority scheme includes ten devices with ten levels of priority, starvation is virtually guaranteed.

Another type of arbitration scheme used in the prior art is a round robin scheme. The standard round robin scheme deals with all the requests in a fixed order. For example, if request A is of high priority, request B of medium priority, and request C of low priority, the round robin scheme will grant request A first, then grant request B, and then grant request C. However, if request A is not present, then request B becomes of high priority, request C of medium priority and request A of low priority. Therefore, the round robin scheme continually shifts priority between all of the devices it services.

As with the fixed priority scheme, round robin schemes also run into starvation problems when handling a large number of requesters. Take the example of a round robin scheme that looks for and grants requests A–Z in alphabetical order, where request A has not been asserted at the time it is sought. If request A is asserted at the time that request B is being sought, then it is possible that request A will not be granted until requests B–Z have been serviced.

Another type of arbitration scheme used in the prior art is a dynamic priority scheme, which utilizes a set of rules that determine the priority of the requestors established by the arbiter. For example, the rules may give a higher priority to requesters that require the most bandwidth of memory access from a SDRAM or give higher priority to requestors that have most recently been serviced.

Dynamic priority schemes allow for in theory, an unlimited number of ways for an arbiter to establish the priority of multiple requestors. However, the more complicated the rules are, the more process overhead will be required to maintain the dynamic priority scheme. This is particularly true in cases where the dynamic priority scheme must arbitrate between real time devices.

There are several other arbitration schemes in the prior art such as a window based scheme that gives each requestors a certain slice of time where memory access will be granted. The advantage of the window based scheme is that it can guarantee bandwidth for its requesters. However, as with the dynamic priority scheme, the windows based scheme involving multiple requestors would be very complicated and require a great deal of logic. Furthermore, a window based scheme would have difficulty maintaining efficient data bus utilization because a slice in time may be set aside for a device when there is no request resulting in idle tine where the bus does nothing.

In view of the foregoing, it is desirable to have methods and an apparatus that is able to establish priority between multiple devices with real time requirements, while at the same time maintaining efficient utilization of the data bus.

SUMMARY OF THE INVENTION

The present invention fills these needs by providing methods and an apparatus for arbitrating between and servicing requestors having real time requirements while maintaining efficient utilization of the data bus. It should be appreciated that the present invention can be implemented in numerous ways, including as a process, an apparatus, a system, a device or a method. Several inventive embodiments of the present invention are described below.

In one embodiment of the present invention, a data bus arbitration system is disclosed. The data bus arbitration system includes a bus status monitor which is coupled to a data bus and generates a bus status signal for use by an arbiter. The arbiter is coupled to number of requesters, each of which belong to a distinct class of requesters. The arbiter arbitrates between multiple requests using heuristics dependent upon the classes of the requesters. The arbiter grants access to one of the requestors to the data bus while maintaining an efficiency of at least 80% of a total data bandwidth of the data bus for all requesters. One of the distinct classes of requesters is preferably a real time class. The data bus arbitration system preferably includes a timer that provides an indication of when access to the data bus must be granted for a real time request.

In another embodiment of the present invention, a method for data bus arbitration is disclosed. The method includes monitoring a status of a data bus. A data bus request from a requestor belonging to a first class of requesters is first processed by a first heuristic method. The method then proceeds with second processing a data bus request from a requestor belonging to a second class of requestors by a second heuristic method. Access to the data bus is granted to a requestor based upon the status of the data bus, the first processing and the second processing, understanding that the first class of requestors is of a generally higher priority than the second class of requestors. The method preferably includes third processing a data bus request from a requester belonging to a third class of requesters by a third heuristic method, understanding that the second class of requesters is of a generally higher priority than the third class of requestors.

In yet another embodiment of the present invention, a method for data bus arbitration is disclosed. The method includes means for monitoring a status of a data bus. A data bus request from a requester belonging to a first class of requesters is processed by a first processing means using a first heuristic method. The method then proceeds with processing a data bus request using a second processing means from a requester belonging to a second class of requesters by a second heuristic method. Access to the data bus is granted to a requestor based upon the status of the data bus, the first processing means and the second processing means, understanding that the first class of requestors is of a generally higher priority than the second class of requestors.

An advantage of the present invention is that it provides for arbitrating between and granting requestors having real time requirements while preventing starvation of all devices in need of service. The arbiter of the present invention is able to grant priority based not only on the type of request received, but also based on the requirements of the request. Furthermore, the present invention maintains efficient utilization of the data bus.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
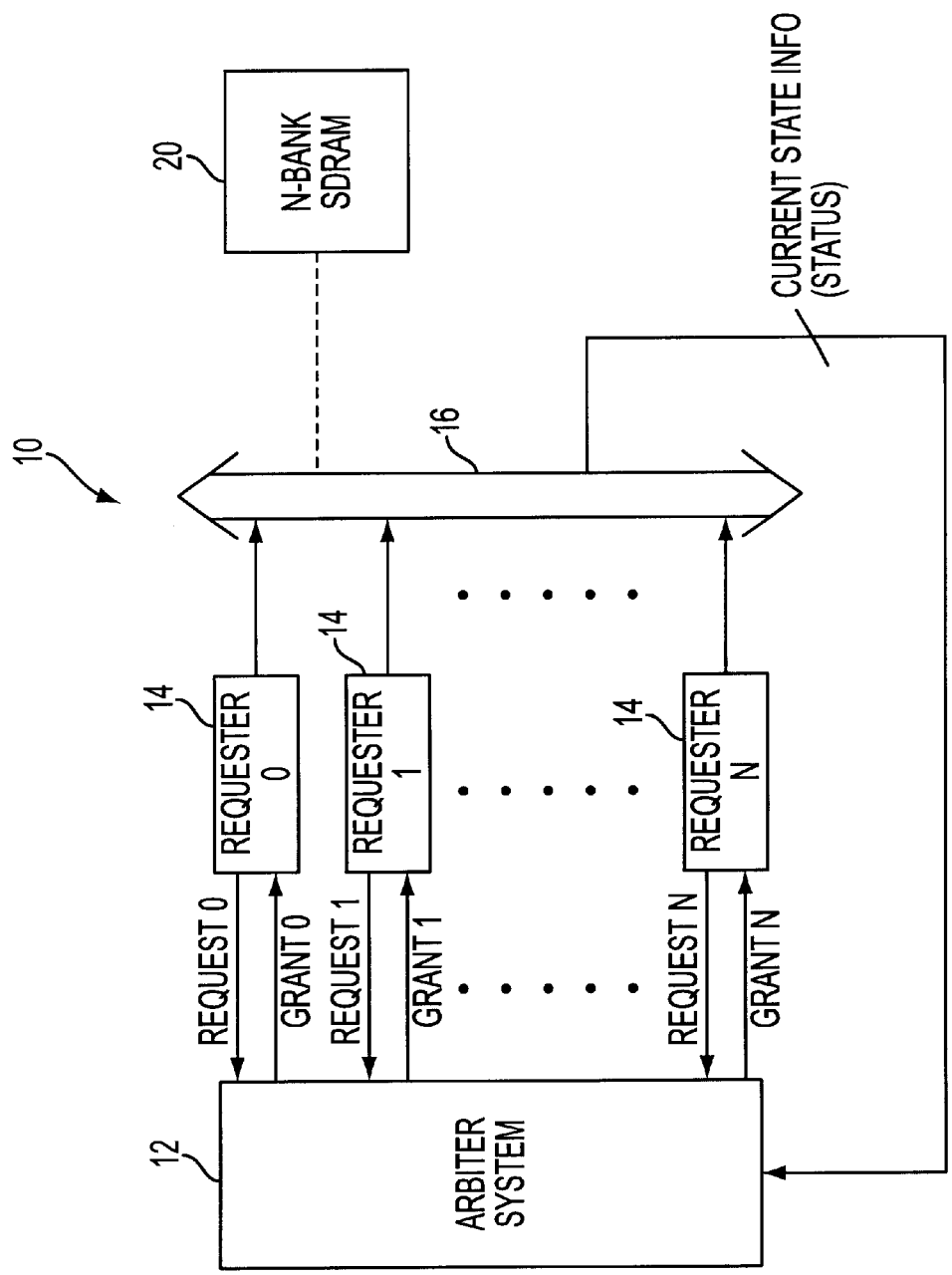
FIG. 1 is a block diagram of a SDRAM system in accordance with one embodiment of the present invention.

FIG. 1 is a block diagram of a SDRAM system 10 in accordance with one embodiment of the present invention. SDRAM system 10 includes an arbiter system 12, a number of requesters 14, a data bus 16, and an N-Bank SDRAM 20, which stores and retrieves data for an infinite number of banks for use by an SDRAM controller and the devices to which the SDRAM controller is attached. Arbiter system 12 receives requests for memory access to N-Bank SDRAM 20 from requesters 14. After establishing the priority of the requests received, arbiter system 12 grants memory access to requestors 14 based on the current state of N-Bank SDRAM 20 communicated from data bus 16. Requestors 14 then access N-Bank SDRAM through data bus 16.

Figure 2:
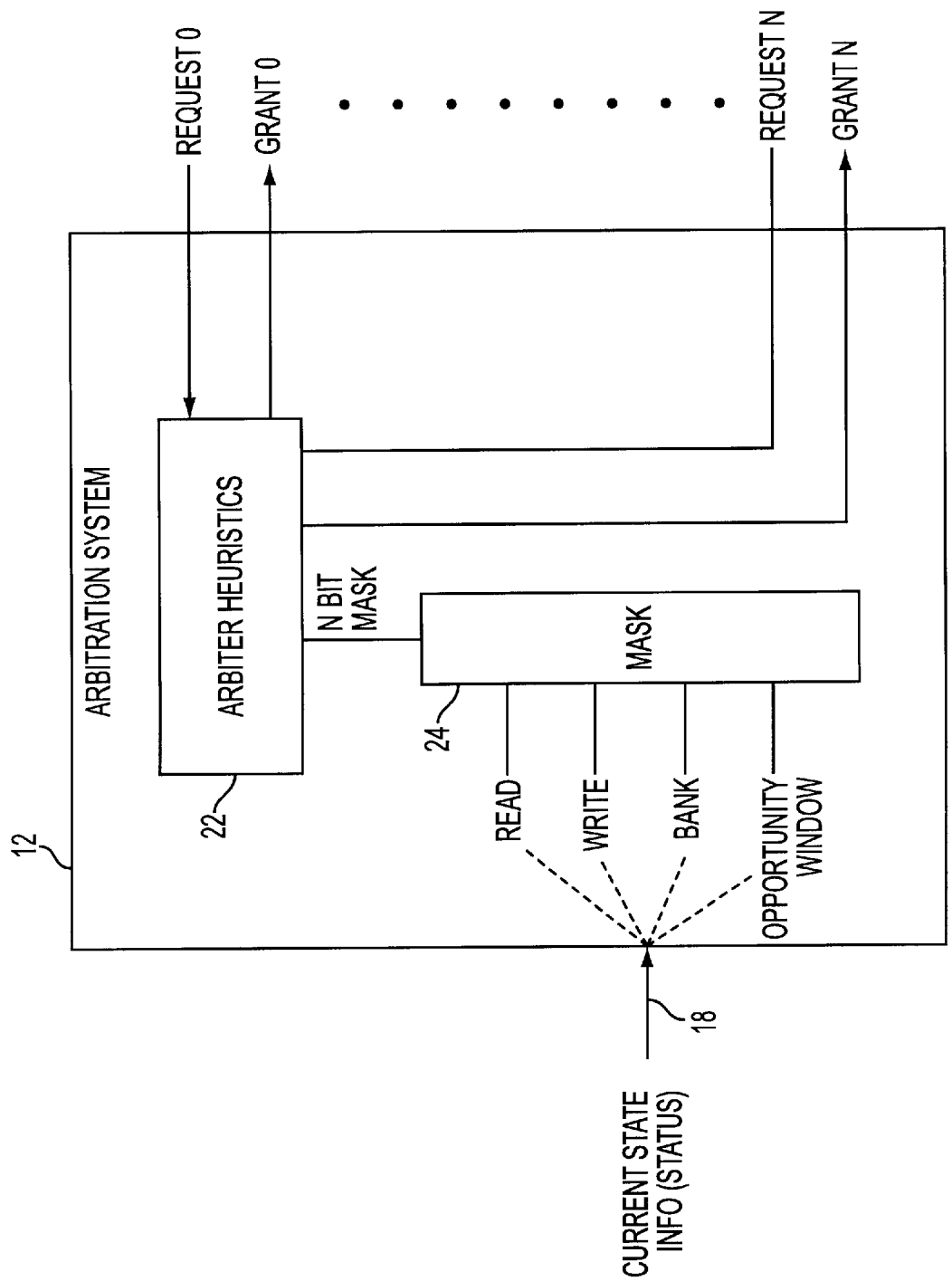
FIG. 2 illustrates arbiter system in accordance with one embodiment of the present invention.

FIG. 2 illustrates arbiter system 12 in accordance with one embodiment of the present invention. Arbiter system 12 includes an arbiter heuristics module 22 and a mask generator 24. Based on the current state information regarding N-Bank SDRAM 20, mask generator 24 creates a mask to optimize the use of the SDRAM, and communicates the information to arbiter heuristics module 22. The current state information includes the identity of the bank, whether there is a read in progress, a write in progress, and whether there is a window of opportunity for overlapping transactions.

Arbiter heuristics module 22 receives requests from requesters 14 and uses a set of heuristic schemes in addition to mask information from mask generator 24 to establish the priority of the requests. Arbiter heuristics module 22 then grants memory access to requesters 14 based on priority and masking for optimization of the SDRAM bus. For more detail regarding the use of current state information to overlap data transactions, please see cross referenced U.S. patent application entitled Methods And Apparatus For Variable Length SDRAM Transfers.

Figure 3:
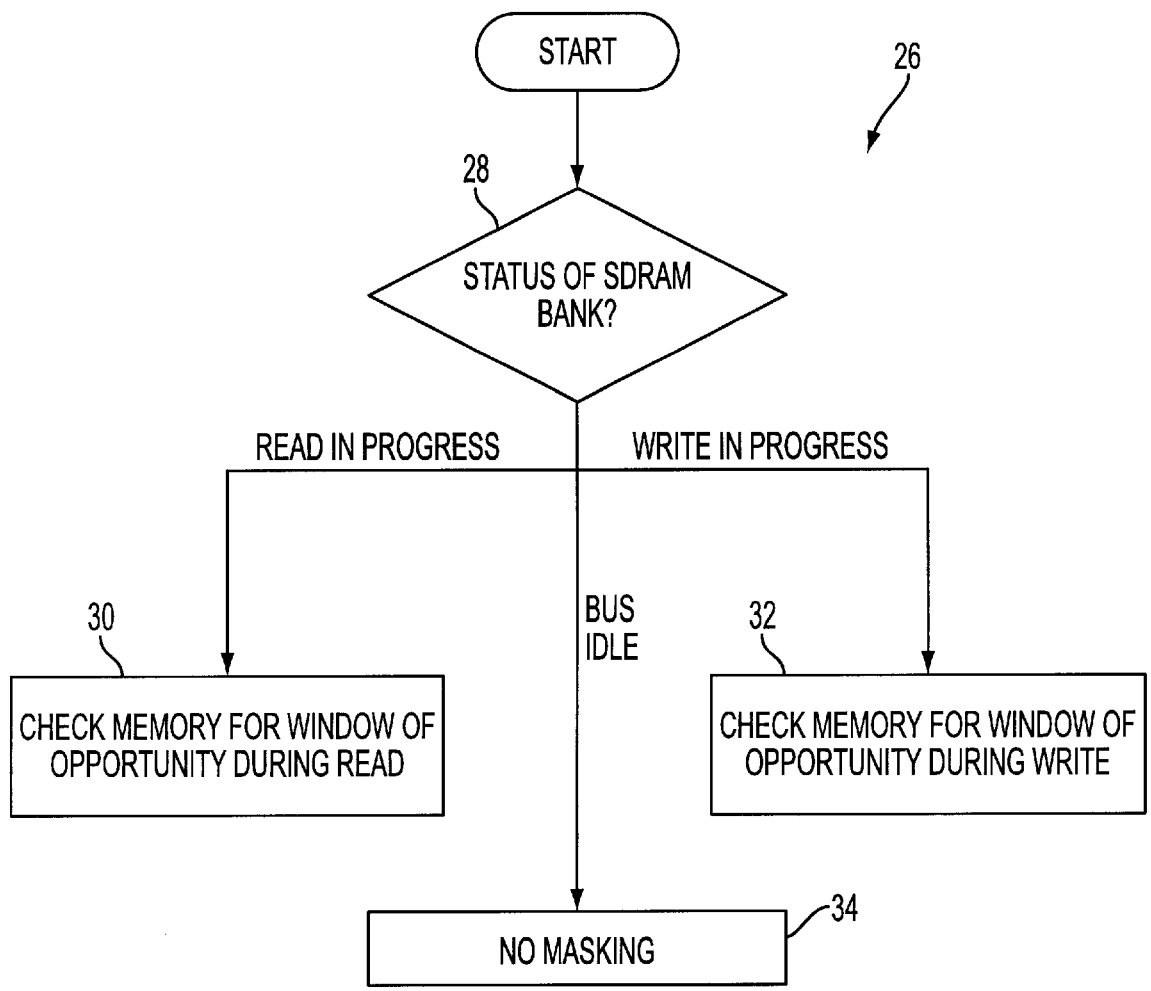
FIG. 3 is a flow chart of a method of generating masks from mask generator.

FIG. 3 is a flow chart of a method 26 of generating masks from mask generator 24. Method 26 begins with an operation 28 which determines whether the status of a SDRAM bank is a read in progress, a write in progress or bus idle. If there is a read in progress, then an operation 30 checks memory for a window of opportunity during the read. If there is a write in progress, then an operation 32 checks memory for a window of opportunity during the write. If operation 30 or operation 32 discovers a window of opportunity in which to overlap transactions, then a mask is generated and transmitted to arbiter heuristics module 22. If operation 28 determines that the bus is idle, then an operation 34 provides that there be no masking of the request.

Figure 4:
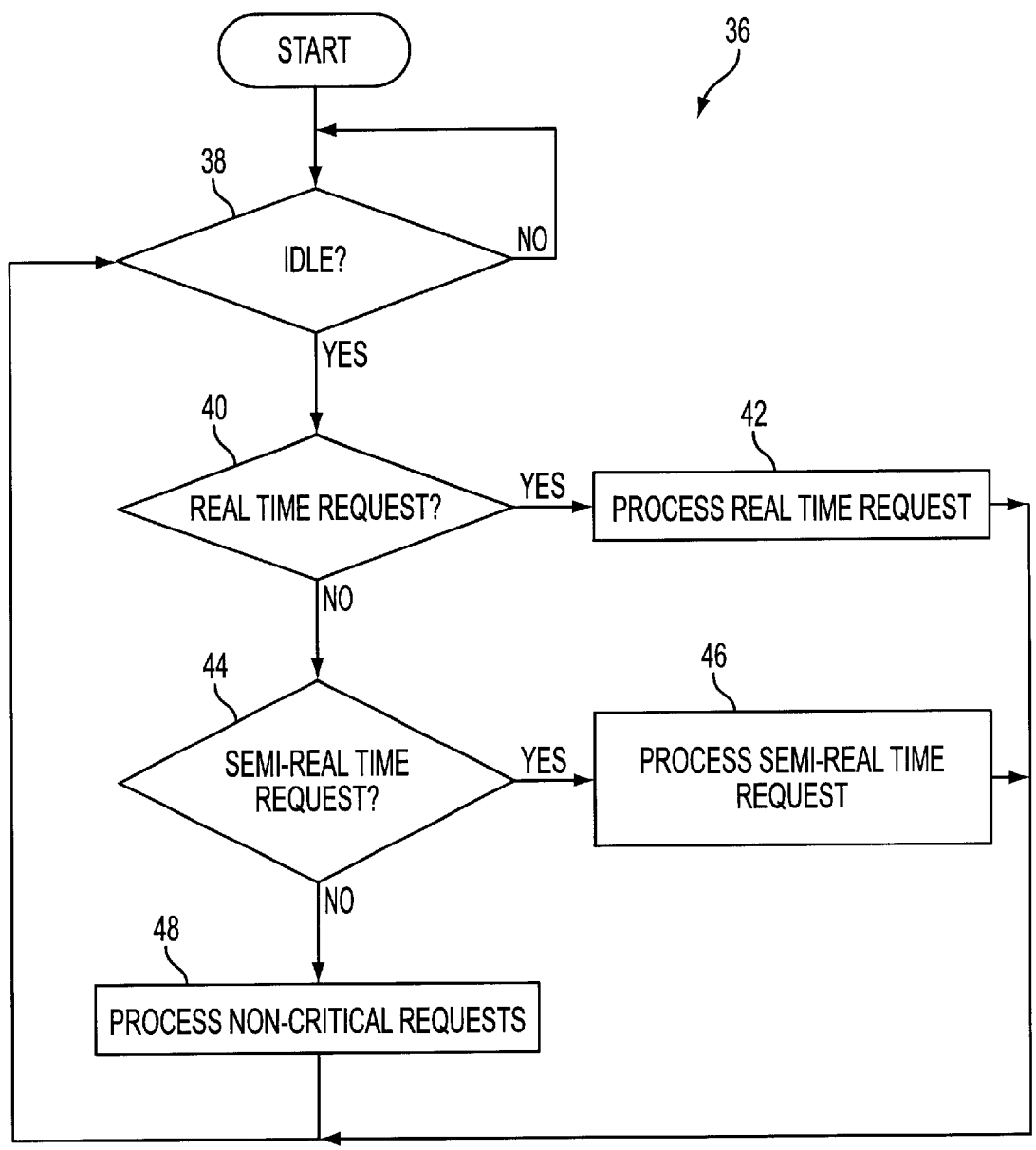
FIG. 4 is a flow chart illustrating a method of processing requests for memory access by arbiter heuristics module.

FIG. 4 is a flow chart illustrating a method 36 of processing requests for memory access by arbiter heuristics module 22. Method 36 begins with an operation 38 which waits until the data bus is at idle. When the data bus is idle, an operation 40 determines whether the request for memory access is a real time request. If there is a real time request, it is assigned the highest priority and processed by an operation 42, after which method 36 starts again at operation 38. If the request is not a real time request, then an operation 44 determines whether the request is a semi-real time request. If there is a semi-real time request, then it is processed by an operation 46, after which method 36 starts again at operation 38. If the request is neither a real time request or a semi-real time request, then it is classified as a non-critical request and processed in an operation 48, after which method 36 repeats at operation 38.

Figure 5:
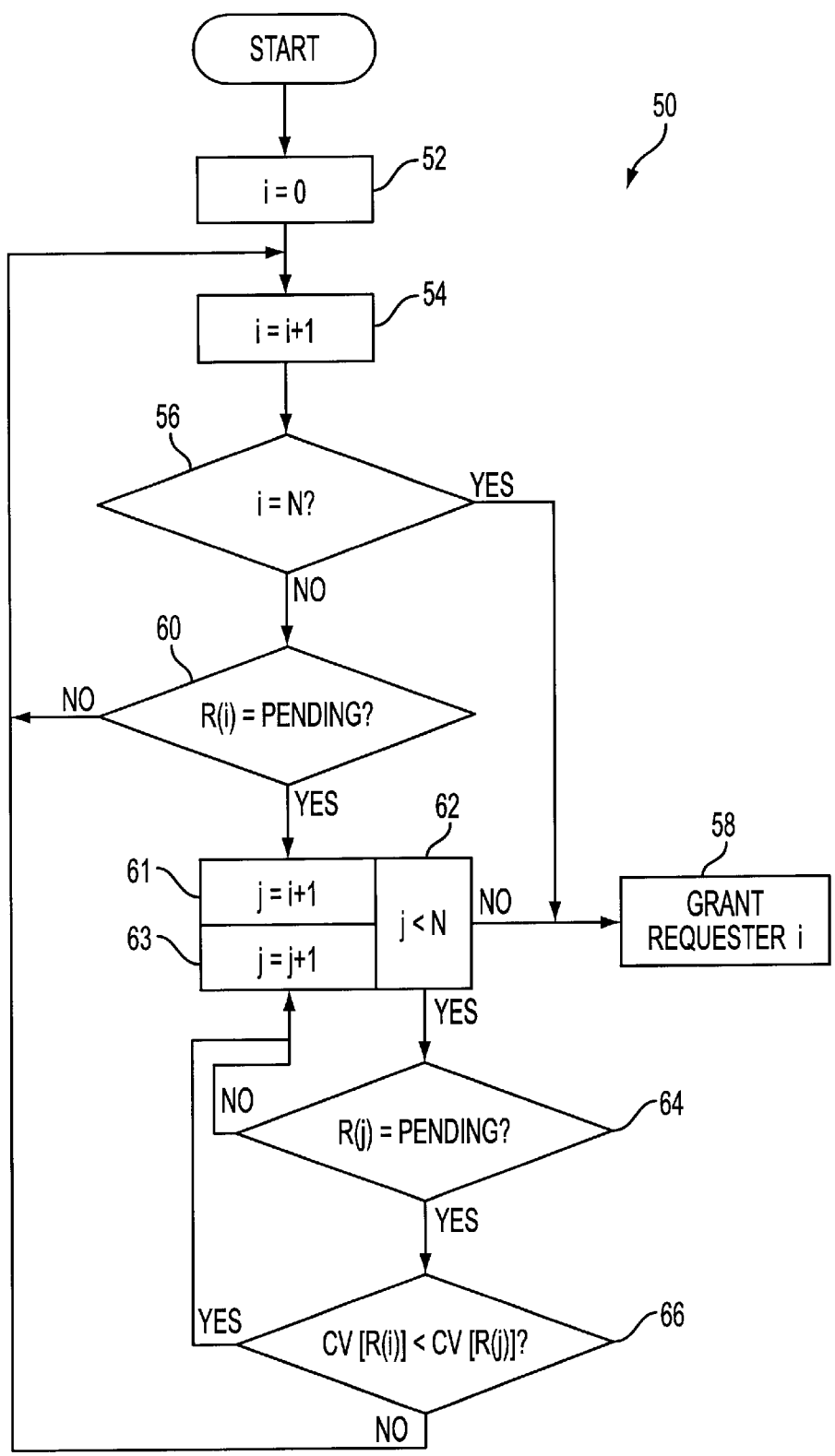
FIG. 5 is a flow chart of a method of the operation to process a real time request in arbiter heuristics module to optimize utilization of the SDRAM bus.

FIG. 5 is a flow chart of a method 50 of operation 42 to process a real time request in arbiter heuristics module 22 to optimize utilization of the SDRAM bus. In method 50, the counter associated with each of the pending real time requests is compared to the counters for all other pending real time requests, to establish the priority of processing the real time requests. Method 50 determines the priority of a real time request based on the real time requirements of the real time requests.

Method 50 begins in an operation 52 where i is set equal to 0, and a counter is started by incrementing i by one (i=i+1) in an operation 54. An operation 56 determines whether i equals N, which is the total number of real time requesters in the system. If i does equal N, requester i is granted in an operation 58 because method 50 incremented i through all of the real time requesters. Therefore the last requestor where i=N must the highest priority. If i does not equal N, then method 50 proceeds to an operation 60 which determines whether or not requester i is pending. A requester is defined as pending if it is asserted and not masked. If requestor i is not pending, then i is incremented again in operation 54.

If requester i is pending, then a loop starts in an operation 61 to find out if requestor i is the request with the highest priority. This is accomplished by setting j equal to i+1 in operation 61. An operation 62 checks if j represents an existing requester by making sure j is less than or equal to N. If j is greater than N, requester i is the last requester, and of highest priority, therefore it is granted in operation 58. If j<N, then an operation 64 determines whether requestor j is pending. If it is not pending, an operation 63 increments the value of j by one, and then returns to operation 62.

If requester j is pending, then CV[R(i)], the counter value of requestor i is compared to CV[R(j)], the counter value of requestor j in an operation 66. If CV[R(i)]≦CV[R(j)], then requestor i has a greater priority than requester j, and method 50 returns to operation 63. If CV[R(i)]>CV[R(j)], then requestor j has a greater priority than requestor i, and method 50 moves on to check another real time request by incrementing i again by returning to operation 54.

Figure 6:
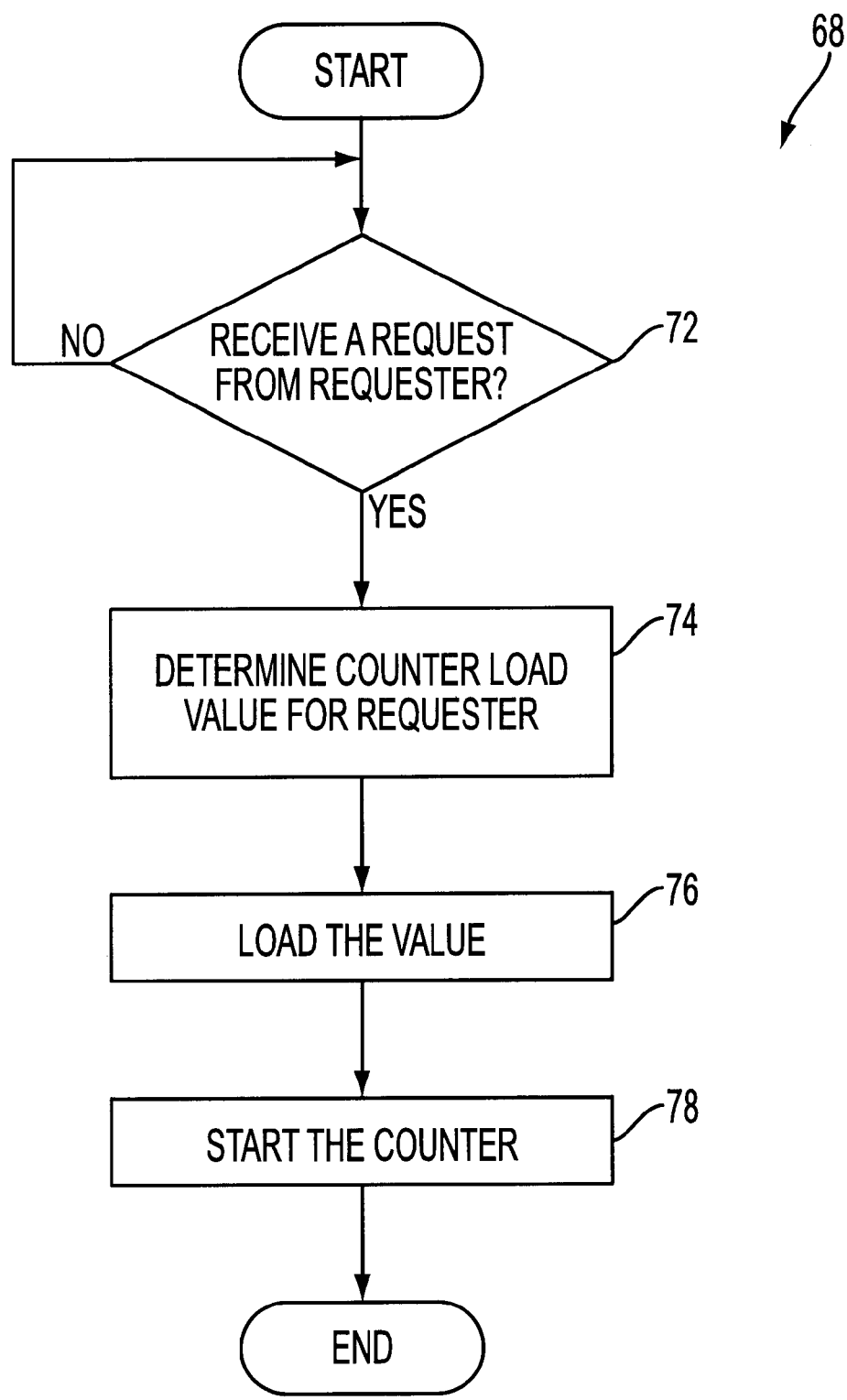
FIG. 6 is a flow chart of a method of operating a counter in arbiter heuristics module for each real time requestor on the system.

FIG. 6 is a flow chart of a method 68 of operating a counter in arbiter heuristics module 22 for each real time requestor on the system. All instances of method 68 run in parallel with method 50 described in FIG. 5. Method 68 begins by waiting until a request has been received from a requester in an operation 72. A counter load value is generated in an operation 74 based on the latency and bus time requirements of the requestor. The counter load value, which reflects the real time and bandwidth requirements of the request, is then loaded in an operation 76, and the counter is started in anoperation78.

Figure 7:
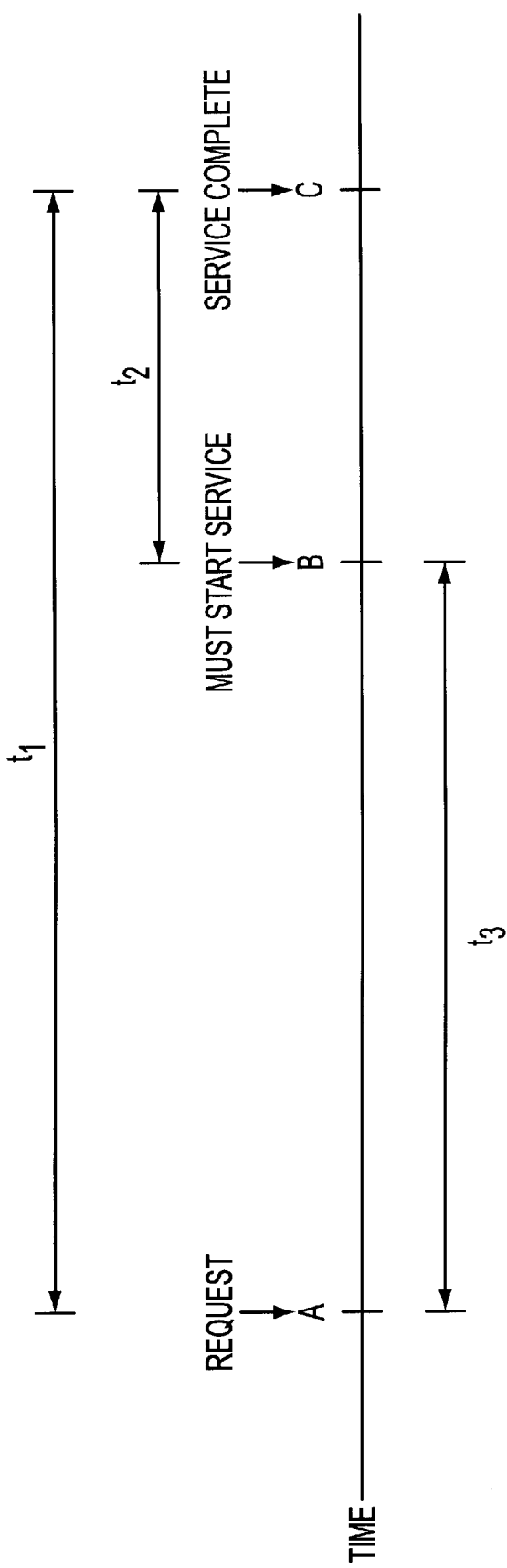
FIG. 7 is a time line representing operation for generating a counter load value.

FIG. 7 is a time line 80 representing operation 74 for generating a counter load value. Point A represents the time a request is received, point C represents the time at which service of the request must be completed, and point B represents the time service for the request must be started in order for the request to be completely serviced by point C. Because time $t_1$, the length of time in which a request can be serviced, and time $t_2$, the actual length of time a request requires to be serviced are known, time $t_3$ is determined and utilized by method 50 to determine the required priority of the real time requesters.

Figure 8:
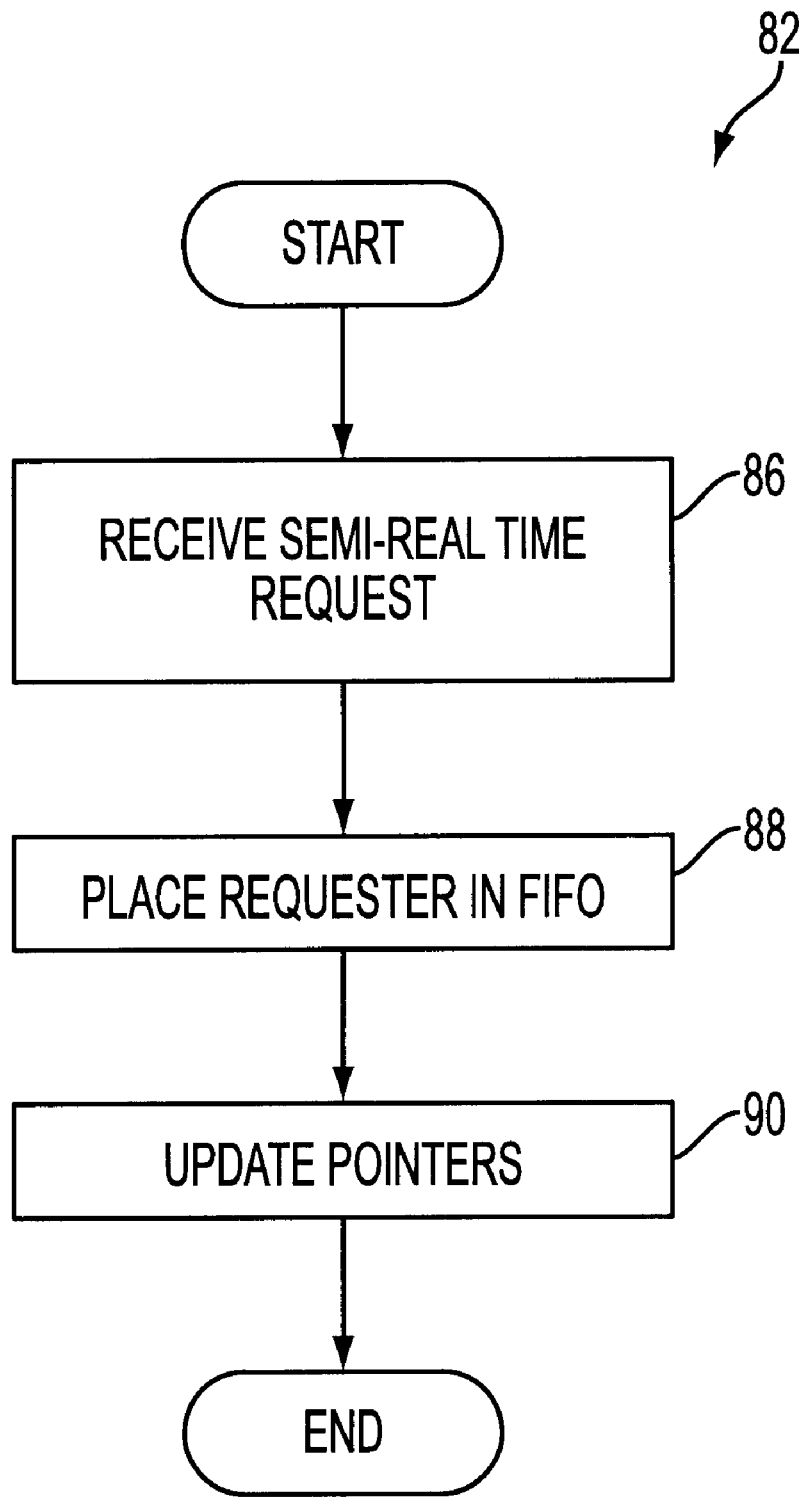
FIG. 8 is a flow chart of a method of the operation of processing a semi-real time request in arbiter heuristics module to optimize the SDRAM bus.

FIG. 8 is a flow chart of a method 82 of operation 46 of processing a semi-real time request in arbiter heuristics module 22 to optimize utilization of the SDRAM bus. Method 82 begins when a semi-real time request is received in an operation 86. An operation 88 places the requestor into a first in first out (FIFO) unit. Pointers are updated in an operation 90, and method 82 ends.

Figure 9:
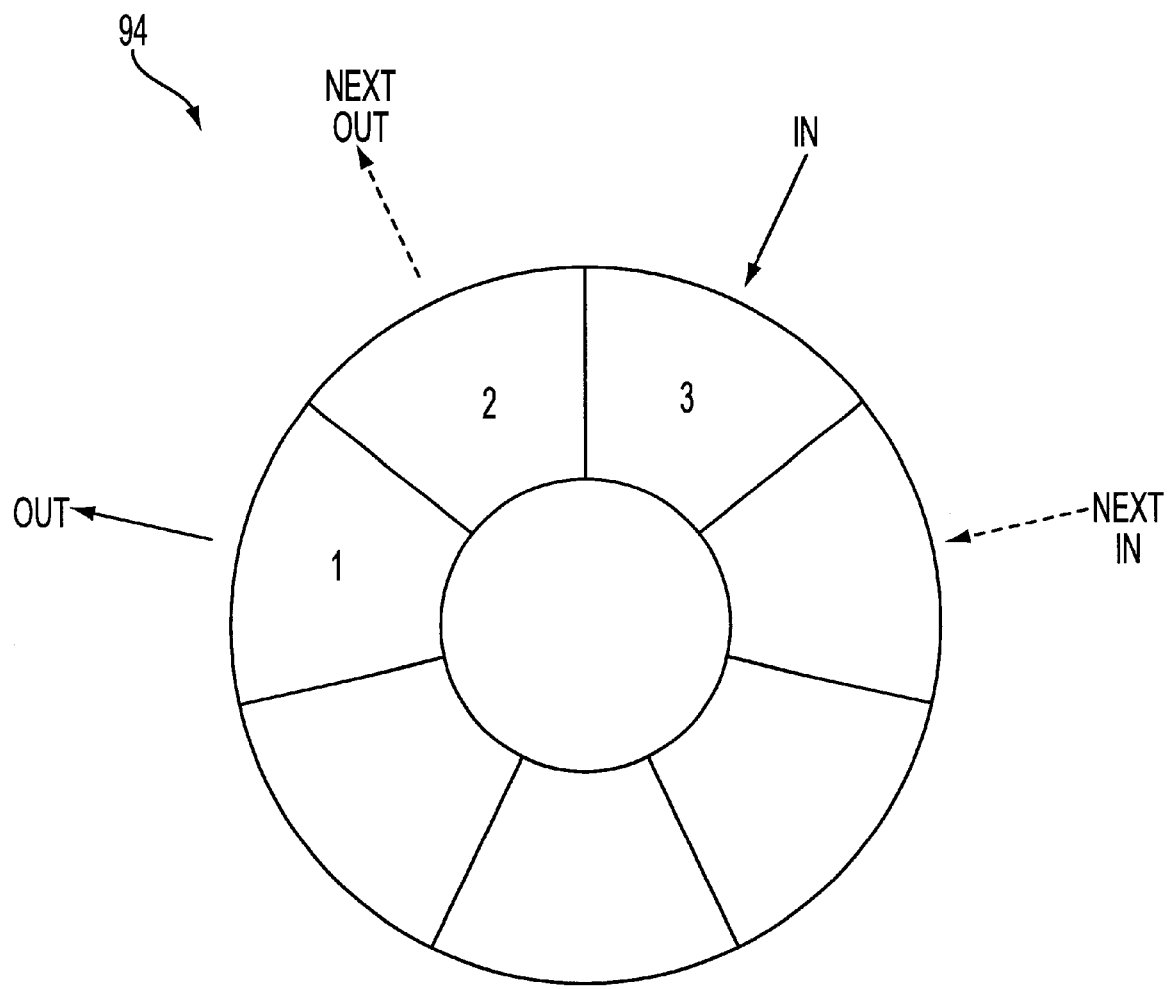
FIG. 9 is a diagram of an N deep FIFO used by method to prioritize the real time requests.

FIG. 9 is a diagram of an N deep FIFO 94 used by method 82 to prioritize the real time requests.

Figure 10:
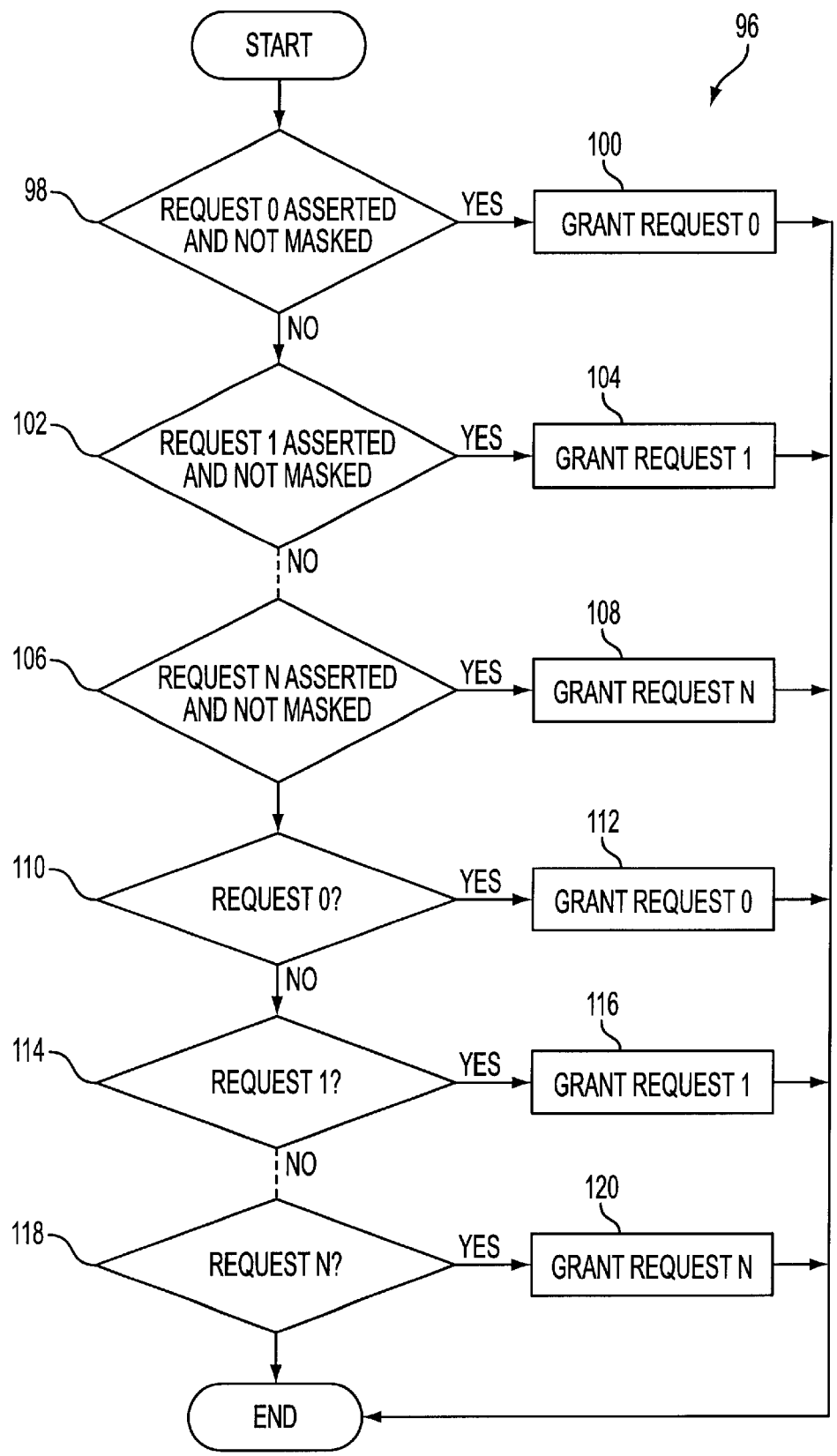
FIG. 10 is a flow chart of a method of operation for processing non-critical requests in arbiter heuristics module to optimize the SDRAM bus.

FIG. 10 is a flow chart of a method 96 of operation 48 for processing non-critical requests in arbiter heuristics module 22 to optimize utilization of the SDRAM bus. Method 96 begins with an operation 98, which determines whether or not request 0 is asserted and not masked. If request 0 is asserted and not masked, then an operation 100 grants request 0. If not, an operation 102 determines whether or not request 1 is asserted and not masked. If request 1 is asserted and not masked, then an operation 104 grants request 1. The process is repeated for all requests 2-N.

Although method 96 is for processing non-critical requests, by searching for requests that are asserted and not masked and granting them first, the resources of the SDRAM can be even further optimized. If no non-masked requests exist, then method 96 proceeds to an operation 110 which simply determines whether or not request 0 exists. If request 0 does exist, then an operation 112 grants request 0. The process is again repeated for all requests 1-N.

In summary, the present invention provides for arbitrating between and granting requesters having real time requirements while preventing starvation of all devices in need of service. Furthermore, the present invention maintains efficient utilization of the data bus. For example, if a real time request is received by the arbiter of the present invention, it will automatically be given a higher priority than all semi-real time requests and all non-critical requests.

The arbiter then compares the requirements of the real time requests with the requirements of all the other real time requests. The requirements include information regarding the time by which a real time request must be serviced, and also the length of time it will take to service the particular request. In this manner that the arbiter is able to determine priority based on which particular real time request has the most restrictive pending time requirement, and is therefore in most "urgent" need of service.

The invention has been described herein in terms of several preferred embodiments. Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A data bus arbitration system comprising:
   a bus status monitor coupled to a data bus and developing a bus status signal including at least a window of opportunity signal; and
   an arbiter coupled to plurality of requesters, wherein each of said plurality of requestors belongs to one of a plurality of classes of requestors, and wherein a total usage of said plurality of requesters of said data bus is at least 80% of a total data bandwidth of said data bus, said plurality of classes including a real-time class, said arbiter arbitrating between multiple requests using heuristics dependent upon said classes of said requestors and upon said bus status signal, and granting access to one of said requesters to said data bus, wherein said heuristics for said real time class include the latency and bus time requirements of said requestors belonging to said real time class.

2. A data bus arbitration system as recited in claim 1 wherein said total usage of said plurality of requestors of said data bus is at least 90% of said total bandwidth of said data bus.

3. A data bus arbitration system as recited in claim 1 wherein said latency and bus time requirements include a timer associated with a request from a real-time requester which aids in the arbitration between multiple requests.

4. A data bus arbitration system as recited in claim 3 wherein said timer provides an indication of when access to said data bus must be granted.

5. A data bus arbitration system as recited in claim 1 wherein a class of requestor includes a semi real-time requester, wherein requestors in said real-time class are of a generally higher priority than requesters in said semi real-time class.

6. A data bus arbitration system as recited in claim 5 wherein said heuristic includes a first-in-first-out (FIFO) heuristic.

7. A data bus arbitration system as recited in claim 5 wherein said classes of requesters includes a non-critical class.

8. A data bus arbitration system as recited in claim 7 wherein requesters in said semi real-time class are of a generally higher priority than requesters in said non-critical class.

9. A data bus arbitration system as recited in claim 7 wherein said heuristic for said non-critical class is a fixed priority heuristic.

10. A data bus arbitration system as recited in claim 1 wherein said bus status signal is a mask.

11. A method for data bus arbitration comprising:
monitoring a status of a data bus including at least a window of opportunity signal;
first processing a data bus request from a requestor belonging to a first class of requesters by a first heuristic method, wherein said first class of requestors includes a real-time class, and wherein said first heuristic method for said real time class includes looking at the latency and bus time requirements of said requesters belonging to said real time class;
second processing a data bus request from a requestor belonging to a second class of requesters by a second heuristic method, wherein said first class of requestors is of a generally higher priority than said second class of requestors; and
granting access to said data bus to a requestor based upon said status of said data bus, said first processing and said second processing.

12. A method for data bus arbitration as recited in claim 11 further comprising:
third processing a data bus request from a requestor belonging to a third class of requesters by a third heuristic method, wherein said second class of requestors is of a generally higher priority than said third class of requestors.

13. A method for data bus arbitration as recited in claim 11 wherein said first heuristic method includes a timer which determines when said requestor must be serviced, and wherein said second heuristic method includes a first-in-first-out (FIFO) heuristic.

14. A method for data bus arbitration as recited in claim 12 wherein said first heuristic method includes a timer which determines when said requestor must be serviced, said second heuristic method includes a first-in-first-out (FIFO) heuristic, and wherein said third heuristic is a fixed priority heuristic.

15. A data bus arbitration system comprising:
a monitor operative to monitor a status of a data bus including at least a window of opportunity signal; and
a processor operative to processes a data bus request from a requestor belonging to a real-time class of requestors by a heuristic method, wherein said heuristic method includes looking at the latency and bus time requirements of said requester;
wherein a requestor is granted access to said data bus based upon said status of said data bus and said heuristic method.

16. A data bus arbitration system as recited in claim 15 wherein said heuristic method includes a timer which determines when said requestor must be serviced.

17. A data bus arbitration system as recited in claim 16 wherein said timer indicates a priority time period in which a service for a request must be started in order to completely service the request.

18. A data bus arbitration system as recited in claim 17 wherein said priority time period is at least partially derived from a total service time less the time required to process the request, said total service time being the time period from a time the request is received to a time the request must be completely serviced.

19. A method for data bus arbitration comprising:
monitoring a status of a data bus including at least a window of opportunity signal;
first processing a data bus request from a requestor belonging to a first class of requestors by a first heuristic method, wherein said first class of requesters includes a real-time class, and wherein said first heuristic method for said real time class includes looking at the latency and bus time requirements of said requesters belonging to said real time class;
second processing a data bus request from a requestor belonging to a second class of requestors by a second heuristic method, wherein said second class of requesters includes a semi-real-time class, and wherein said first class of requestors is of a generally higher priority than said second class of requestors;
third processing a data bus request from a requestor belonging to a third class of requesters by a third heuristic method, wherein said third class of requesters includes a non-critical class, and wherein said first and second class of requesters are of a generally higher priority than said third class of requesters; and
granting access to said data bus to a requester based upon said status of said data bus, said first processing, said second processing and said third processing.

20. A data bus arbitration system comprising:
a bus status monitor coupled to a data bus and developing a bus status signal including at least a window of opportunity signal; and
an arbiter coupled to plurality of requestors, wherein each of said plurality of requesters belongs to one of a plurality of classes of requesters, and wherein a total usage of said plurality of requestors of said data bus is at least 80% of a total data bandwidth of said data bus, said plurality of classes including at least one of a real-time class, a semi-real time class and a non-critical class, said arbiter arbitrating between multiple requests using heuristics dependent upon said classes of said requestors and upon said bus status signal, and granting access to one of said requesters to said data bus, wherein said heuristics for said real time class include the latency and bus time requirements of said requesters belonging to said real time class, and wherein said heuristic for said semi-real time class includes a first-in-first-out (FIFO) heuristic, and wherein said heuristic for said non-critical class is a fixed priority heuristic.

* * * * *